United States Patent
Kaneko

(10) Patent No.: US 11,270,452 B2
(45) Date of Patent: Mar. 8, 2022

(54) IMAGE PROCESSING DEVICE AND IMAGE PROCESSING METHOD

(71) Applicant: CLARION CO., LTD., Saitama (JP)

(72) Inventor: Takayuki Kaneko, Saitama (JP)

(73) Assignee: CLARION CO., LTD., Saitama (JP)

( * ) Notice: Subject to any disclaimer, the term of this patent is extended or adjusted under 35 U.S.C. 154(b) by 35 days.

(21) Appl. No.: 16/671,297

(22) Filed: Nov. 1, 2019

(65) Prior Publication Data

US 2020/0151895 A1 May 14, 2020

(30) Foreign Application Priority Data

Nov. 14, 2018 (JP) .............................. JP2018-213429

(51) Int. Cl.
| | | |
|---|---|---|
| *G06T 7/60* | (2017.01) | |
| *G06T 7/90* | (2017.01) | |
| *G06T 7/70* | (2017.01) | |

(52) U.S. Cl.
CPC .................. *G06T 7/60* (2013.01); *G06T 7/70* (2017.01); *G06T 7/90* (2017.01); *G06T 2207/30256* (2013.01); *G06T 2207/30264* (2013.01)

(58) Field of Classification Search
CPC .... G06T 7/60; G06T 7/90; G06T 7/70; G06T 2207/30256; G06T 2207/30264; G06K 9/00798; G06K 9/00812; G06K 9/00791; G06K 9/4604
See application file for complete search history.

(56) References Cited

U.S. PATENT DOCUMENTS

2009/0207045 A1 8/2009 Jung
2013/0265429 A1 10/2013 Yoon et al.

FOREIGN PATENT DOCUMENTS

| JP | 3-99952 | 4/1991 |
| JP | 2003-118522 | 4/2003 |
| JP | 2012-210864 | 11/2012 |
| JP | 2013-216305 | 10/2013 |

OTHER PUBLICATIONS

Extended European Search Report dated Apr. 20, 2020 in corresponding European Patent Application No. 19208332.7.

*Primary Examiner* — Qian Yang
(74) *Attorney, Agent, or Firm* — Wenderoth, Lind & Ponack, L.L.P.

(57) ABSTRACT

An image processing device includes a marker detector configured to detect markers including white lines extending in two directions on a road surface based on an image signal from an imager that takes an image of the road surface around a vehicle, a parking frame detector configured to compute adjacent markers on the road surface among the detected markers, and to detect a parking frame defined by the adjacent markers based on a distance between the adjacent markers, and a shape estimator configured to detect extending directions of the white lines of the markers that are included in the detected parking frame, and to estimate a shape of the parking frame based on the extending directions of the detected white lines.

8 Claims, 8 Drawing Sheets

IMAGE PROCESSING DEVICE AND IMAGE PROCESSING METHOD

CROSS-REFERENCE TO RELATED APPLICATION

The present application is based on and claims priority from Japanese Patent Application No. 2018-213429 filed on Nov. 14, 2018, the disclosure of which is hereby incorporated by reference in its entirety.

FIELD OF THE INVENTION

The present disclosure relates to an image processing device and an image processing method.

BACKGROUND

A vehicle parking assistance device such as disclosed in JP2012-210864A is known in the art. For example, in such a vehicle parking assistance device, a parking frame in a parking lot is detected by detecting markers painted on the road surface at locations corresponding to ends of the parking frame, and then data regarding the parking frame is provided to a monitor in the vehicle cabin, or to controllers such as snares or a steering device in the vehicle to assist the parking of the vehicle. Also, estimating the parking frame from markers is known in the art (see JP2013-216305A, for example). During the parking assistance operation, the markers, each of which is formed by white lines, are detected using the image processing relative to image signals from an imager which takes an image of the road surface around the vehicle.

However, in JP2013-216305A, the parking frame is estimated by patterning the extending directions of the white lines at the corner portions, which are defined by the intersecting white lines, and performing the pattern matching. Therefore, according to the technique disclosed in JP2013-216305A, it takes a considerable amount of time for the pattern matching, and there is a certain limit to the widths of the white lines that can be detected.

Accordingly, an object of the present disclosure is to provide an image processing device and an image processing method which can quickly and reliably estimate the parking frame on the road surface of the parking lot or the like.

SUMMARY

To achieve the purpose, an image processing device of the present disclosure includes a marker detector configured to detect markers including white lines extending in two directions on a road surface based on an image signal from an imager that takes an image of the road surface around a vehicle. A parking frame detector is configured to compute adjacent markers on the road surface among the detected markers, and to detect a parking frame defined by the adjacent markers based on a distance between the adjacent markers. A shape estimator is configured to detect extending directions of the white lines of the markers that are included in the detected parking frame, and to estimate a shape of the parking frame based on the extending directions of the detected white lines.

DETAILED DESCRIPTION

Figure 1:
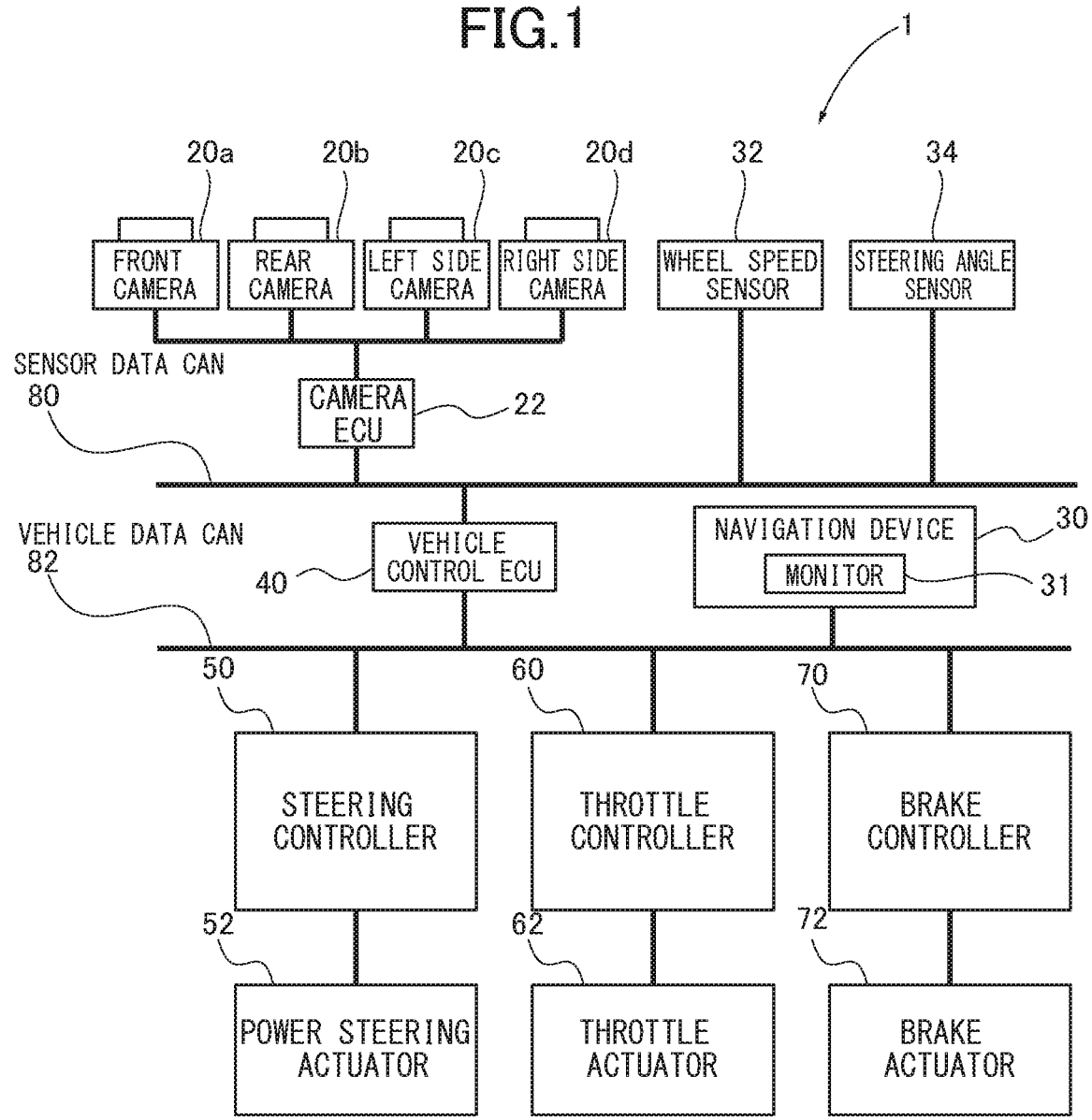
FIG. 1 is a block diagram illustrating the schematic configuration of a parking assistance device to which an image processing device according to an embodiment of the present disclosure is applied.
Figure 2:
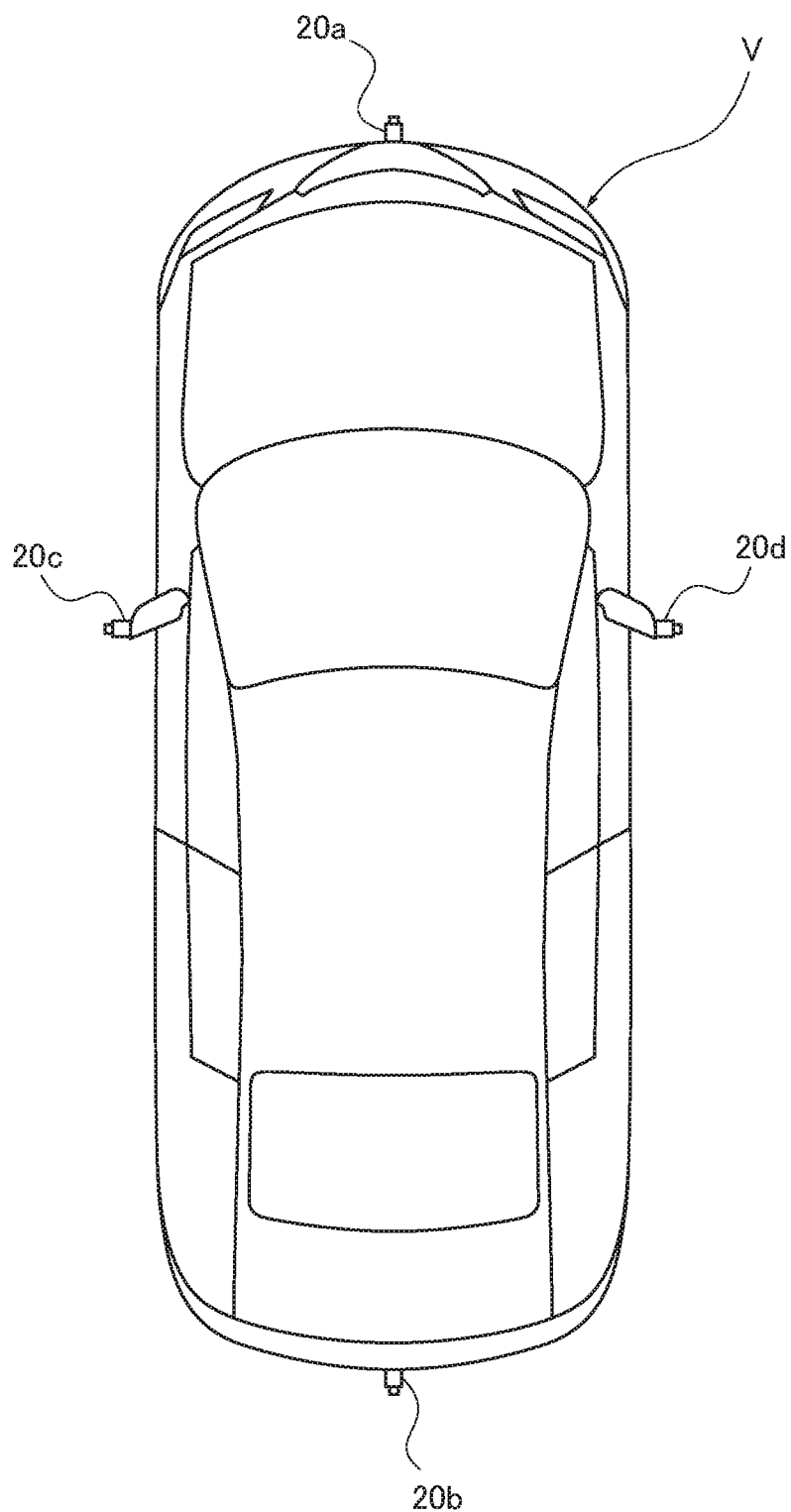
FIG. 2 is a schematic view illustrating an example of the position of an imager in the parking assistance device according to the embodiment.

Hereinafter, embodiments of the present disclosure will be described with reference to the drawings. FIG. 1 is a block diagram illustrating the schematic configuration of a parking assistance device to which an image processing device according to an embodiment of the present disclosure is applied. FIG. 2 is a schematic view illustrating the position of an imager in the parking assistance device according to the embodiment.

A parking assistance device 1 is provided in a vehicle V shown in FIG. 2 and configured to perform a parking assistance operation. Specifically, the parking assistance device 1 is configured to recognize a parking frame to which the vehicle V can be parked. Further, the parking assistance device 1 is configured to control the vehicle V to be parked in the recognized parking frame.

As shown in FIG. 2, the vehicle V includes an imager including a plurality of small cameras. The small cameras are provided on front, right, left, rear portions of the vehicle V, respectively.

The imager includes a front camera 20a, a rear camera 20b, a left side camera 20c and a right side camera 20d. The front camera 20a is provided on a front bumper or a front grill of the vehicle V to face forward (i.e. traveling direction) of the vehicle V. The rear camera 20b is provided on a rear bumper or rear garnish of the vehicle V to face rearward of the vehicle V. The left side camera 20c is provided on a left side door mirror to face the left side from the vehicle V. The right side camera 20d is provided on a right side door mirror to face the right side from the vehicle V.

Each of the front camera 20a, the rear camera 20b, the left side camera 20c, and the right side camera 20d is provided with a wide-angle lens or a fish-eye lens which can observe a wide range around the vehicle V. The four cameras 20a, 20b, 20c and 20d can fully observe areas including the road surface around the vehicle V without omission (i.e. entire areas around the vehicle V). The cameras 20a, 20b, 20c and 20d constitute the imager which takes an image of the road surface around the vehicle V. It should be noted that the term "the camera 20" or "the cameras 20" is used when explaining the camera(s) 20a, 20b, 20c and 20d (or imager) without distinguishing them hereinafter.

As shown in FIG. 1, the parking assistance device 1 includes the front camera 20a, the rear camera 20b, the left side camera 20c, the right side camera 20d, a camera ECU 22, a navigation device (display device) 30, a wheel speed sensor 32, and a steering angle sensor 34.

The camera ECU 22 is configured to control the cameras 20. Further, the camera ECU 22 is configured to perform processes such as a process for generating an overhead image, a process for detecting the parking frame, and a process for determining whether the vehicle V can be parked in the detected parking frame by using data obtained from the cameras 20.

The navigation device 30 includes a monitor 31 with an image display function. The navigation device 30 includes a storage or memory which stores data such as map data for route guidance. The navigation device 30 is configured to provide the route guidance to a target point or a destination set by an operator (e.g. a driver) based on data such as the map data and the current position data of the vehicle V detected by a GPS device (not shown). Various images during the route guidance are displayed on the monitor 31.

The wheel speed sensor 32 is configured to detect the wheel speed of the vehicle V. The data (i.e. wheel speed) detected by the wheel speed sensor 32 is provided to a vehicle control ECU 40.

The steering angle sensor 34 is configured to detect the steering angle of the vehicle V. The steering angle is at the neutral position angle (i.e. 0 degree) when the vehicle V travels straight. The steering angle sensor 34 outputs the rotation angle from the neutral position angle as the steering angle. The data (i.e. steering angle) detected by the steering angle sensor 34 is provided to the vehicle control ECU 40.

Further, the parking assistance device 1 includes the vehicle control ECU 40, a steering controller 50, a throttle controller 60, and a brake controller 70.

The vehicle control ECU 40 is configured mainly by a microcomputer including a CPU (Central Processing Unit), a ROM (Read Only Memory), a RAM (Random Access Memory) and the like. The vehicle control ECU 40 is configured to perform various processes to assist the parking of the vehicle V based on the detected data from the camera ECU 22, the wheel speed sensor 32 and the steering angle sensor 34.

Specifically, when the parking assistance device 1 is started, for example, by the driver operating (e.g. pressing) an automatic parking start switch (not shown), the vehicle control ECU 40 performs an automatic parking process for automatically parking the vehicle V in the parking frame where the camera ECU 22 determines that the vehicle can be parked.

The steering controller 50 is configured to control the steering angle of the vehicle V by activating a power steering actuator 52 based on the vehicle control data determined by the vehicle control ECU 40.

The throttle controller 60 is configured to control the throttle of the vehicle V by activating a throttle actuator 62 based on the vehicle control data determined by the vehicle control ECU 40.

The brake controller 70 is configured to control the brake of the vehicle V by activating a brake actuator 72 based on the vehicle control data determined by the vehicle control ECU 40.

A sensor data CAN (registered trademark)(Controller Area Network) 80, which is an in-vehicle LAN (Local Area Network), connects the vehicle control ECU 40 to the camera ECU 22, the wheel speed sensor 32 and the steering angle sensor 34.

A vehicle data CAN (registered trademark) 82, which is the in-vehicle LAN, connects the vehicle control ECU 40 to the steering controller 50, the throttle controller 60 and the brake controller 70.

In the parking assistance device 1 with the above configuration, an image processing device 100 according to the present embodiment is mainly configured by the camera ECU 22.

Figure 3:
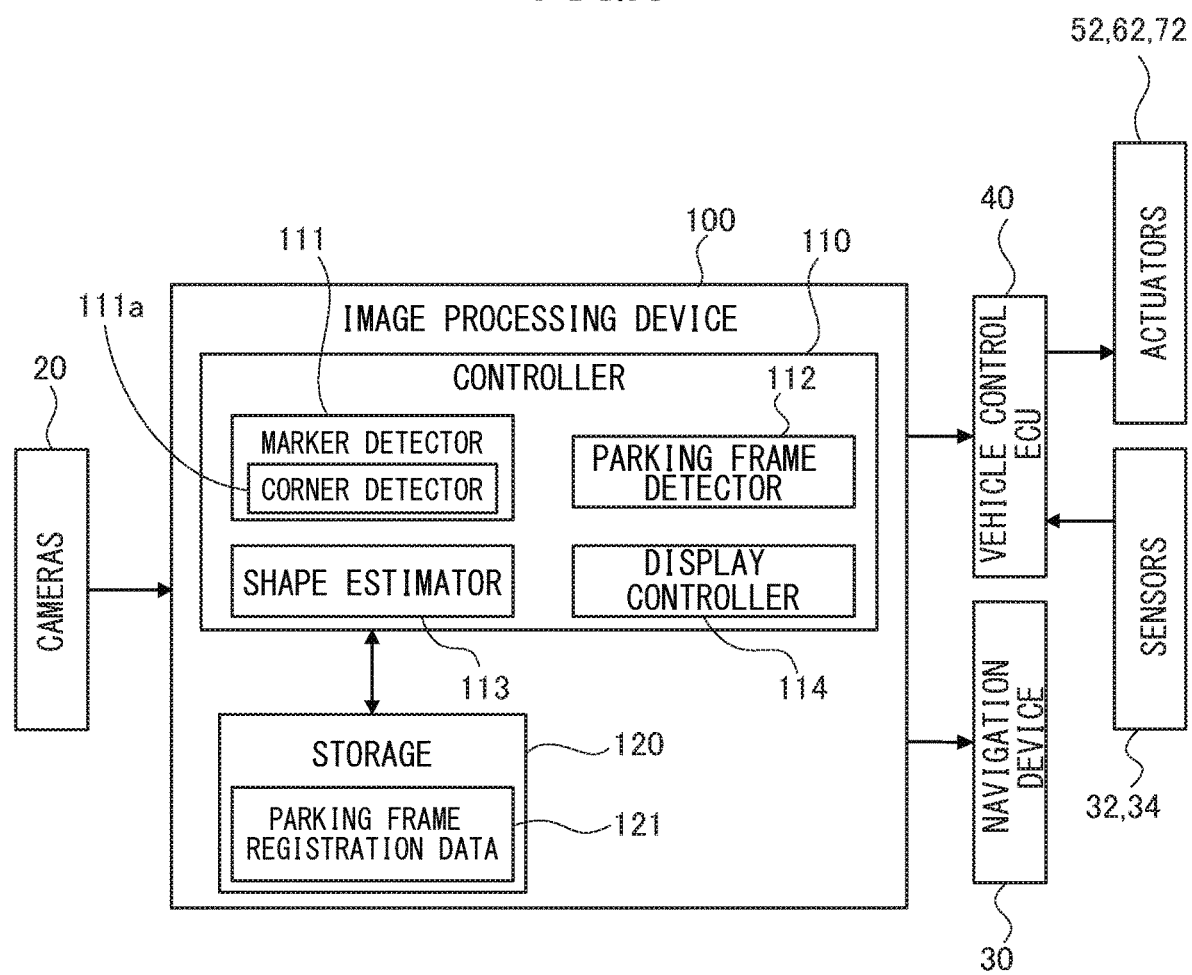
FIG. 3 is a function block diagram illustrating the schematic configuration of the image processing device according to the embodiment.

FIG. 3 is a function block diagram illustrating the schematic configuration of the image processing device 100 according to the embodiment.

The image processing device 100 according to the present invention includes a controller 110 and a storage 120.

The controller 110 is mainly configured by the camera ECU 22 to control the entire image processing device 100. In addition, the controller 110 is configured to provide data (position and shape of the parking frame, etc.) necessary to the automatic parking process to the vehicle control ECU 40 such that the vehicle control ECU 40 performs the automatic parking process for automatically parking the vehicle V in the parking frame which has been determined that the vehicle V can be parked based on the parking frame and markers determined and estimated by a marker detector 111, a parking frame detector 112 and a shape estimator 113, which will be described below.

The vehicle control ECU 40 is configured to control the power steering actuator 52, the throttle actuator 62 and the brake actuator 72 based on data provided from the controller 110 and further based on data detected by the wheel speed sensor 32 and the steering angle sensor 34. In FIG. 3, the power steering actuator 52, the throttle actuator 62 and the brake actuator 72 are referred to as "ACTUATORS", and the wheel speed sensor 32 and the steering angle sensor 34 are referred to as "SENSORS".

The controller 110 includes computing elements represented by a programmable logic device such as a CPU and a FPGA, and an integrated circuit such as an ASIC.

The image processing device 100 has the functional configuration as shown in FIG. 3. Specifically, the storage 120 of the image processing device 100 stores a control program (not shown), and the controller 110 executes the control program when the image processing device 100 is activated. Particularly, it is preferable for the image processing device 100 to include computing elements such as the FPGA capable of high-speed computing since the image processing device 100 according to the present embodiment performs high-speed image processing, which will be described below.

The controller 110 includes the marker detector 111, the parking frame detector 112, the shape estimator 113, and a display controller 114.

The marker detector 111 is configured to detect markers including white lines extending in two directions on the road surface based on image signals from the cameras 20 which take images of the road surface around the vehicle V.

Particularly, the marker detector 111 includes a corner detector 111a. The corner detector 111a is configured to detect corner portions of the markers, which are defined by the intersecting white lines, by detecting corners in the image based on the image signals. The corner detector 111a preferably detects the corner portions based on the brightness patterns of the image signals. The marker detector 111 preferably detects the markers based on the positions of the corner portions detected by the corner detector 111a.

The parking frame detector 112 is configured to compute adjacent markers on the road surface from the markers detected by the marker detector 111 and to detect the parking frame identified by the adjacent markers based on a distance between the adjacent markers.

The shape estimator 113 is configured to detect the extending directions of the white lines of the markers which are included in the parking frame detected by the parking frame detector 112 and to estimate the shape of the parking frame based on the extending directions of the detected white lines. Particularly, the shape estimator 113 detects the extending directions of the white lines based on the brightness patterns of the image signals.

The display controller 114 is configured to output a display control signal to the navigation device 30 to display images on the monitor 31 of the navigation device 30. For example, the images to be displayed on the monitor 31 include the images of the road surface around the vehicle V taken by the cameras 20, the images of the markers and the parking frame detected and estimated by the marker detector 111, the parking frame detector 112 and the shape estimator 113, or the images of the markers and the parking frame appropriately overlaid on the images of the road surface.

The storage 120 is mainly configured by the vehicle control ECU 40. The storage 120 includes mass storage media such as a hard disk drive and storage media such as semiconductor storage media (e.g. a ROM, a RAM). The storage 120 temporarily or non-temporarily (e.g. semi-permanently or permanently) stores various data to be used in various operations in the controller 110.

Further, the storage 120 stores parking frame registration data 121. The parking frame registration data 121 is data regarding the parking frame detected and estimated by the parking frame detector 112 and the shape estimator 113.

The operations of the components of the image processing device 100 shown in FIG. 3 will be described in detail below.

Now, the operation of the image processing device 100 according to the present embodiment will be described as an example with reference to a flowchart in FIG. 4 and the views in FIGS. 5 to 10.

Figure 4:
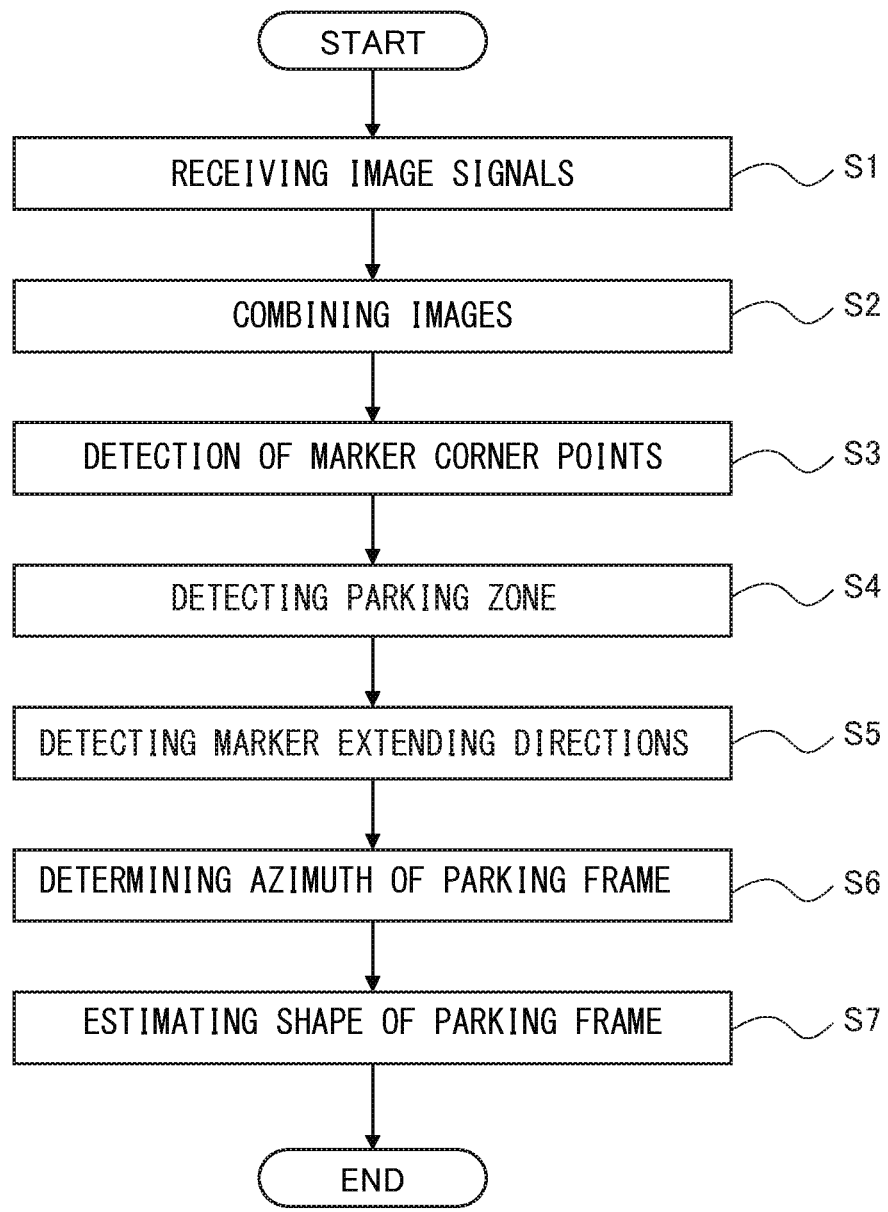
FIG. 4 is a flowchart for explaining an example of the operation of the image processing device according to the embodiment.

FIG. 4 is a flowchart for explaining the operation of the image processing device 100. The operation shown in the flowchart of FIG. 4 is started as the driver operates (e.g. presses) the automatic parking start switch (not shown) to input an instruction for starting the automatic parking.

In Step S1, the controller 110 of the image processing device 100 receives image signals of the road surface around the vehicle V taken by the cameras 20.

In Step S2, the controller 110 generates a signal by combining the image signals received in Step S1. The image signals to be combined in Step S2 are signals for displaying on the navigation device 30 an overhead image (i.e. an image looked down from above the vehicle V as if a camera was installed above the vehicle V). Methods for generating such an overhead image are known in the art and disclosed in Japanese patent publications such as JP H03-99952 A and JP 2003-118522 A, for example.

It should be noted that the image combining operation described above may not be performed in Step S2 or may be performed after a corner point detecting operation in Step S3, which will be described below. However, the processing load of the image processing device 100 can be reduced by performing the corner point detecting operation after generating the overhead image.

In Step S3, the marker detector 111 detects corner points of the markers on the road surface based on the images combined in Step S2.

Figure 5:
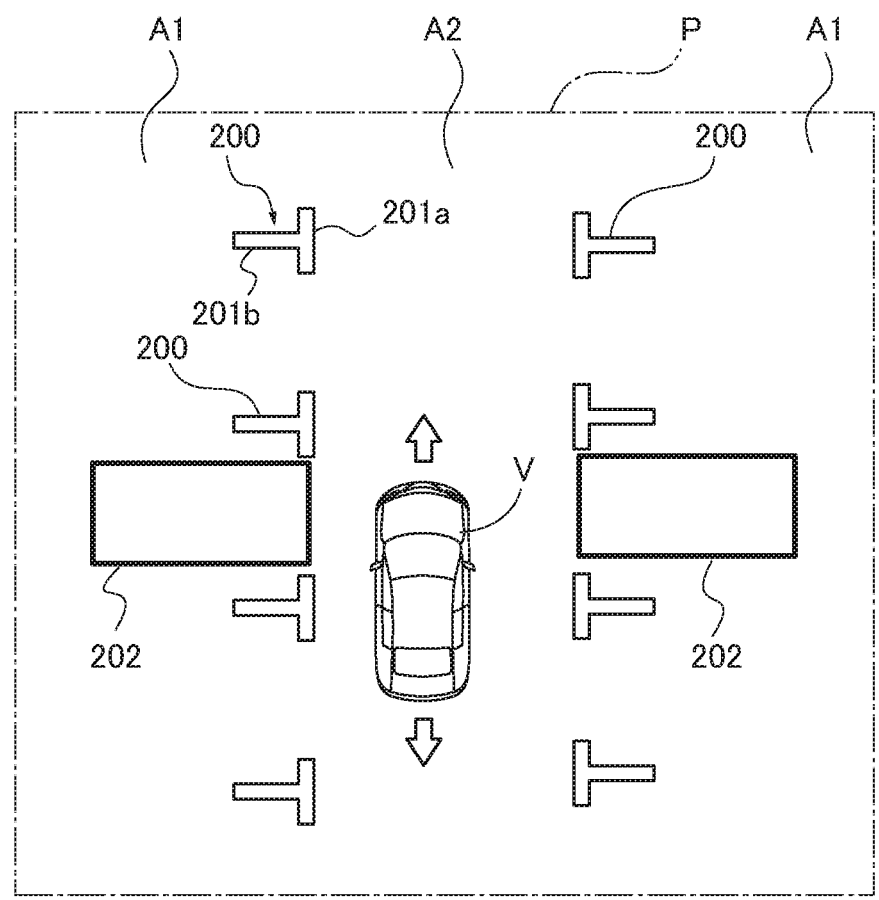
FIG. 5 is a schematic view illustrating an example of the operation of the image processing device according to the embodiment.

With reference to FIG. 5, an example of the markers provided on the road surface of the parking lot or the like will be described. The parking lot P shown in FIG. 5 includes a parking zone A1 where the vehicle V is to be parked, and a passageway zone or non-parking zone A2 through which the vehicle V travels. A plurality of markers 200 are provided (e.g. painted) on the road surface of the parking lot P at the boundary between the parking zone A1 and the passageway zone A2.

Each of the markers 200 shown in FIG. 5 includes a first white line 201a and a second white line 201b. The first white line 201a extends in the traveling direction of the vehicle V (shown with arrows) in the passageway zone A2. The second white line 201b is attached (or intersects) to the first white line 201a in the center thereof so that the first white line 201a is substantially equally divided. The second white line 201b extends toward the parking zone A1 from a position where the second white line 201b is attached to the first white line 201a. In other words, the second white line 201b extends perpendicular to the first white line 201a.

The adjacent two markers 200 define the parking frame 202 where the vehicle V is to be parked. In the illustrated embodiment, the parking frame 202 is a rectangular frame which substantially circumscribes the outline of the vehicle V in a plane view. The parking frame 202 is not necessarily painted on the road surface of the parking lot P. Actually, the parking frame 202 is not painted on the road surface of the parking lot P in the embodiment shown in FIG. 5. Therefore, it is necessary to estimate the position and the extending direction of the parking frame 202 based on the positions of the markers 200 and the extending directions of the first and second white lines 201a, 201b which form the markers 200 when the parking assistance device 1 performs the parking assistance operation for parking the vehicle V to the target parking frames 202.

Figure 6:
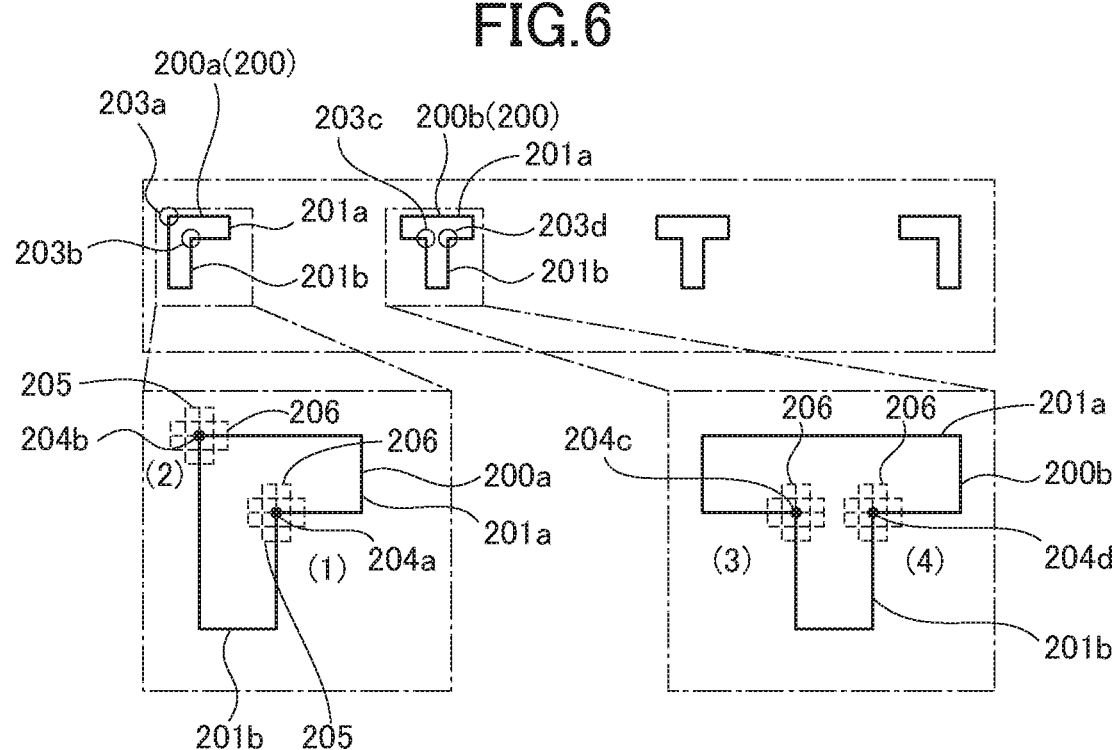
FIG. 6 is a schematic view illustrating an example of the operation of the image processing device according to the embodiment.

Now, the detection of the corner points of the marker 200 as shown in FIG. 5 by the marker detector 111 will be described in detail with reference to FIGS. 6 and 7.

The corner detector 111a of the marker detector 111 is configured to detect the corner portions of the markers 200 based on the brightness value of the image signal of the road surface around the vehicle V. The corner portions are formed at positions where the edges (outer lines) of the first white line 201a and the second white line 201b intersect. As shown in FIG. 6, the markers 200 include a marker 200a having an L shape (or a reverse L shape) and a marker 200b having a T shape. For example, the L-shaped marker 200a includes two corner portions 203a, 203b formed by the first and second white lines 201a, 201b. Similarly, the T-shaped marker 200b includes two corner portions 203c, 203d formed by the first and second white lines 201a, 201b. It should be noted that the term "corner portion 203" or "corner portions 203" is used when explaining the corner portion(s) 203a, 203b, 203c and 203d without distinguishing them hereinafter.

The marker 200a includes corner points 204a, 204b and the marker 200b includes corner points 204c, 204d. The corner points 204a, 204b, 204c and 204d are formed at points where the outer lines of the first and second white lines 201a, 201b intersect. The corner detector 111a detects the corner portions 203a, 203b, 203c and 203d by detecting the corner points 204a, 204b, 204c and 204d. It should be noted that the term "corner point 204" or "corner points 204" is used when explaining the corner point(s) 204a, 204b, 204c and 204d without distinguishing them hereinafter.

An example of the detection of the corner points 204a, 204b, 204c and 204d by the corner detector 111a will be described with reference to FIGS. 6 and 7.

Figure 7:
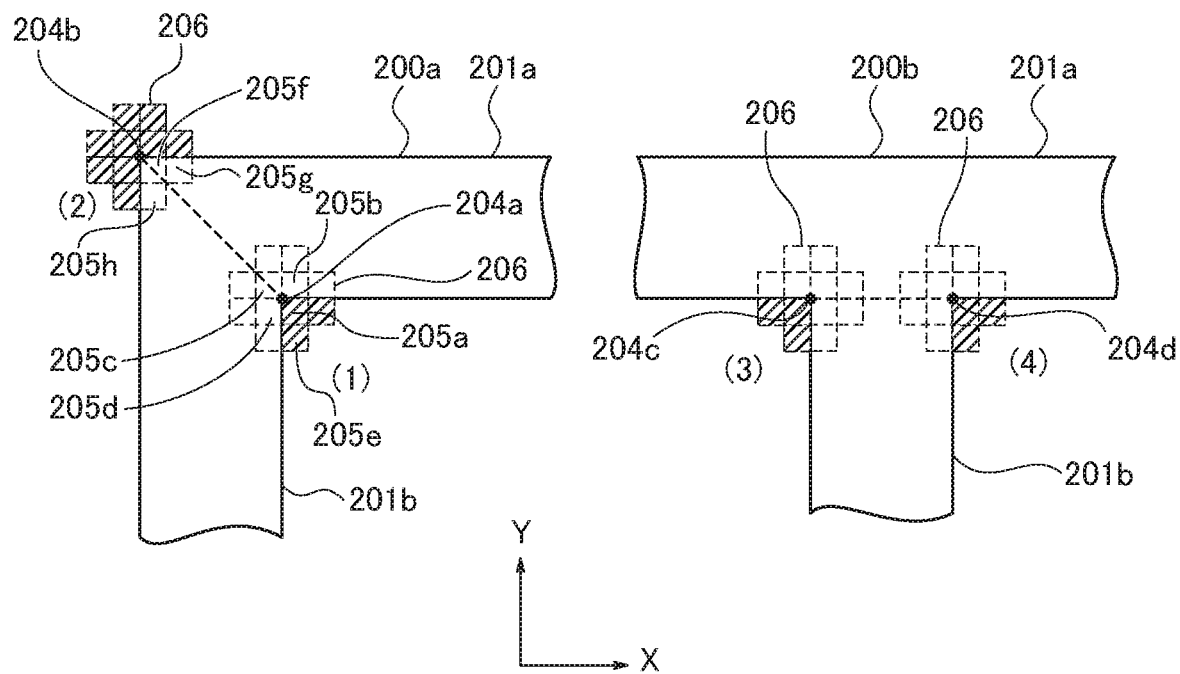
FIG. 7 is a schematic view illustrating an example of the operation of the image processing device according to the embodiment.

As shown in FIG. 7, a detection area 206 is provided in relation to the corner point 204a. The detection area 206 includes twelve pixels 205 as shown with (1) in FIG. 7. The corner point 204a is detected based on the brightness value of the pixels 205 in the detection area 206. Here, an X-axis is defined to extend in the horizontal direction, and a Y-axis is defined to extend in the vertical direction. In FIG. 7, pixels 205b, 205c, 205d, and 205e are positioned around a target pixel 205a. Specifically, the pixel 205b is located above the target pixel 205a, the pixel 205c is located on the upper left side of the target pixel 205a, the pixel 205d is located on the left side of the target pixel 205a, and the pixel 205e is located below the target pixel 205a. An upper left point from the target pixel 205a is determined as the corner point 204a when the brightness values of the pixels 205b, 205c and 205d are relatively higher and accordingly detected as white pixels, and the brightness value of the pixel 205e is relatively lower and accordingly detected as a black pixel (shown by a hatching in the figure).

Similarly, another detection area 206 is provided in relation to a corner point 204b as shown with (2) in FIG. 7. As shown in FIG. 7, a pixel 205g is located on the right side of a target pixel 205f, and a pixel 205h is located below the target pixel 205f. An upper left point from the target pixel 205f is determined as the corner point 204b when the pixels 205g, 205h are determined as the white pixels and the other pixels 205 of the detection area 206 are determined as the black pixels.

In addition, detection areas 206 are provided in relation to the corner points 204c and 204d as shown with (3) and (4) in FIG. 7. Similar to the corner points 204a, 204b in FIG. 7, determination is made based on the positional relationship between the white pixels and the black pixels from the pixels 205 of the detection area 206.

Returning to FIG. 4, the parking frame detector 112 detects the parking zone in Step S4 based on the corner portions 203a to 203d (the corner points 204a to 204d) of the markers 200 detected in Step S3. More specifically, the parking frame detector 112 computes the distance between the corner points 204a to 204d of the adjacent two markers 200 on the road surface as the distance between the adjacent two markers 200, and determines that there is the parking zone between the markers 200 if the distances are within a predetermined threshold. At this time, the parking frame detector 112 determines the distance between the adjacent markers 200 based on the distance between the corner point 204a and the corner point 204c which face each other.

The parking zone detected by the parking frame detector 112 is a rectangular frame including a shorter side between the corner points 204a, 204c facing each other, and longer sides respectively extending from the corner points 204a, 204c in the direction perpendicular to the shorter side. The longer sides are straight lines each having a length corresponding to the length of the vehicle V (e.g. five meters).

The parking frame detector 112 temporarily stores the coordinate values of four corners of the rectangular frame which defines the parking zone as the parking frame registration data 121 in the storage 120.

Returning to FIG. 4, in Step S5, the shape estimator 113 detects the extending directions of the first and second white lines 201a, 201b of the markers 200 adjacent to the parking frame 202 tentatively determined in Step S4.

The detection of the extending directions of the first and second white lines 201a, 201b by the shape estimator 113 will be described with reference to FIGS. 8 and 9.

First, the shape estimator 113 selects one of the markers 200 which define the parking zone detected in Step S4. Then, the shape estimator 113 recognizes the positions of the edges of the first and second white lines 201a, 201b by scanning the brightness values of the pixels with regard to the marker 200 from the corner point 204 of the selected marker 200 to directions considered to be perpendicular to the extending directions of the first and second white lines 201a, 201b.

Figure 8:
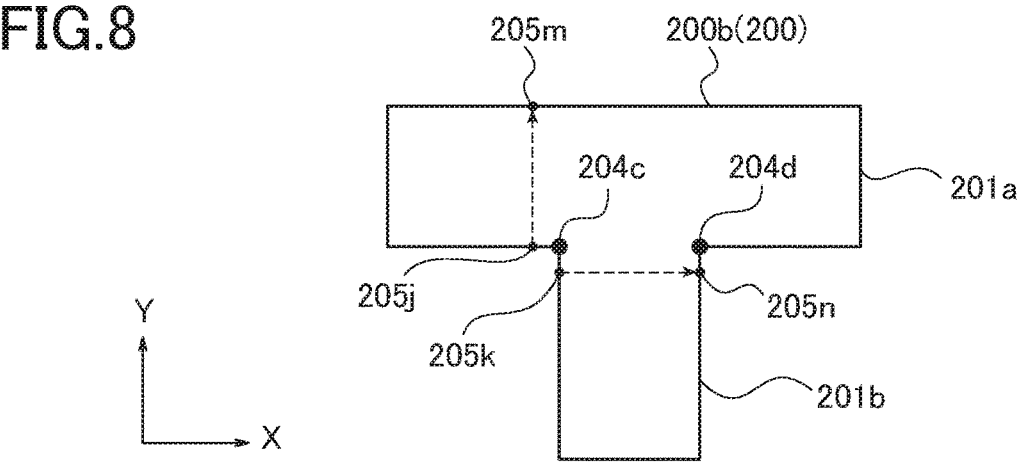
FIG. 8 is a schematic view illustrating an example of the operation of the image processing device according to the embodiment.

As shown in FIG. 8, the X-axis is defined to extend in the horizontal direction, and the Y-axis is defined to extend in the vertical direction. A pixel 205j is located on the left side of the corner point 204c and a pixel 205k is located on the bottom of the corner point 204c. The shape estimator 113 selects a pixel advanced from the pixel 205j by one in the positive Y-axis direction and a pixel advanced from the pixel 205k by one in the positive X-axis direction, and determines whether the brightness values of the pixels are relatively higher (i.e. white pixels). If the pixels are determined as the white pixels, the shape estimator 113 further selects a pixel advanced by one in the positive Y-axis direction and a pixel advanced by one in the positive X-axis direction, and determines whether the brightness values of the pixels are the white pixels or not. The shape estimator 113 repeats the above determination. The scanning of the pixels is stopped when the pixels are determined as the black pixels 205m, 205n. The positions where the black pixels 205m, 205n are located are determined to correspond to the edges of the first and second white lines 201a, 201b. Similarly, the scanning of the pixels is also performed with regard to the corner point 204d.

At this time, when the white pixels cannot be found or the pixels do not change from the white pixels to the black pixels even if the scanning of the pixels is performed by a predetermined distance (i.e. the scanning is performed for a predetermined number of pixels), the shape estimator 113 cancels or nullifies the parking zone detected in Step S4. Considering the marker 200 including the second white line 201b which is inclined relative to the first white line 201a and intersecting thereto, it is preferable that the scanning width of the pixels is set wider (i.e. the predetermined distance is set longer).

Figure 9:
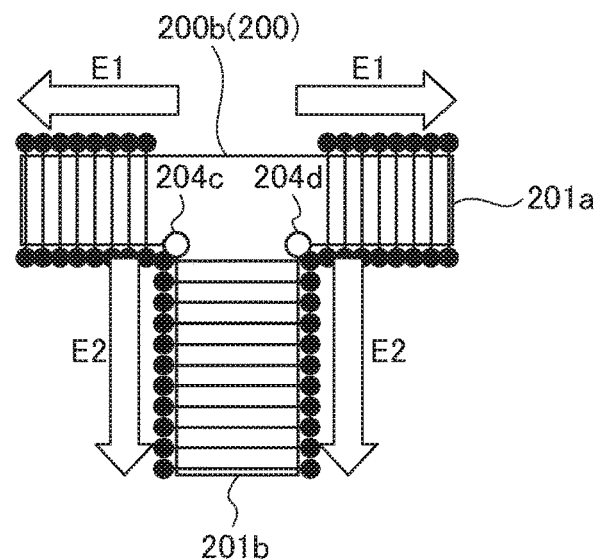
FIG. 9 is a schematic view illustrating an example of the operation of the image processing device according to the embodiment.

Then, the shape estimator 113 repeats scanning the pixels from pixels located on the left and bottom of the pixels 205j, 205k which are the starting points of the scanning as shown in FIG. 9. Thereby, the extending directions of the first and second white lines 201a, 201b (shown with arrows E1, E2 in FIG. 9) can be detected. At this time, the scanning directions of the pixels may be modified in accordance with the result obtained from the scanning which has previously been performed. Specifically, in the case of the marker 200 including the intersecting second white line 201b inclined relative to the first white line 201a as mentioned above, the extending direction of the second white line 201b may be modified in accordance with the result obtained from the scanning which has previously been performed without performing the scanning only in the positive Y-axis direction.

The scanning of the pixels by the shape estimator 113 is not limited to the X-axis and Y-axis directions as shown in FIG. 8. For example, the two corner points 204 of the marker 200 have been detected, and therefore, the straight line between the two corner points 204 may be considered as the extending direction of the first white line 201a. In addition, a direction perpendicular to the straight line between the two corner points 204 may be tentatively set as the extending direction of the second white line 201b.

Returning to FIG. 4, in Step S6, the shape estimator 113 determines the azimuth, that is, an angle where the second white line 201b intersects the first white line 201a based on the extending directions of the first and second white lines 201a, 201b detected in Step S5. This azimuth is obtained as an average value for each of the corner points 204 constituting the parking zone.

Figure 10:
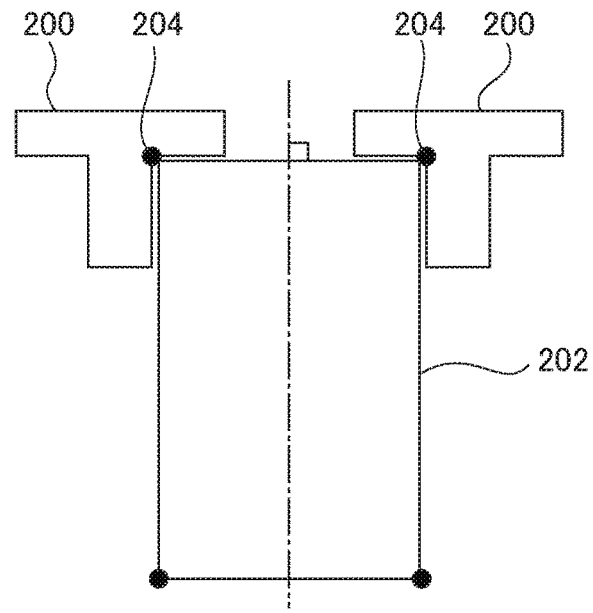
FIG. 10 is a schematic view illustrating an example of the operation of the image processing device according to the embodiment.

In Step S7, the shape estimator 113 determines the parking frame 202 along the azimuth determined in Step S6 and registers the determined parking frame 202. Specifically, as shown in FIG. 10, the shape estimator 113 determines, as the parking frame 202, a rectangular frame having a shorter side between the corner points 204 facing each other, and longer sides (i.e. the straight lines) respectively extending from the corner points 204 in the directions of the azimuth determined in Step S6 by the length of the vehicle V (e.g. five meters). Then, the shape estimator 113 stores the coordinate values of the four corners of the rectangular frame which defines the parking frame 202 as the parking frame registration data 121 in the storage 120.

In the image processing device 100 of the present embodiment configured as above, the shape estimator 113 detects the extending directions of the first and second white lines 201a, 201b of the markers 200 included in the parking frame 202 which is detected by the parking frame detector 112, and estimates the shape of the parking frame 202 based on the extending directions of the detected first and second white lines 201a, 201b.

Accordingly, the shape of the parking frame 202 can accurately be estimated without patterning the extending directions of the white lines at the corner portions of the marker, as in the conventional image processing device. As a result, the parking frame 202 on the road surface of the parking lot P or the like can be estimated quickly and reliably.

The parking frame 202 may be detected on condition that a distance between adjacent corner portions 203 among the corner portions 203 detected by the corner detector 111a is a fixed distance. However, the corner detector 111a may incorrectly detect, as the corner portions 203, the roughness of the road surface of the parking lot P, portions of the parking lot P where the paint has been peeled off, the parked white vehicle V or sunbeams through leaves of trees, if the parking frame 202 is set only by detecting the corner portions 203 by the corner detector 111a. Accordingly, false detection may occur if the parking frame 202 is detected only in accordance with the distance of the corner portions 203 detected by the corner detector 111a.

The parking frame 202 may be set to face a direction perpendicular to the straight line between the corner points 204 which are separated by a certain distance. However, in the above setting, it is difficult to properly set the parking frame 202 and register it in a case that the marker 200 includes the second white line 201b which is inclined relative to the first white line 201a and intersects thereto.

Figure 11:
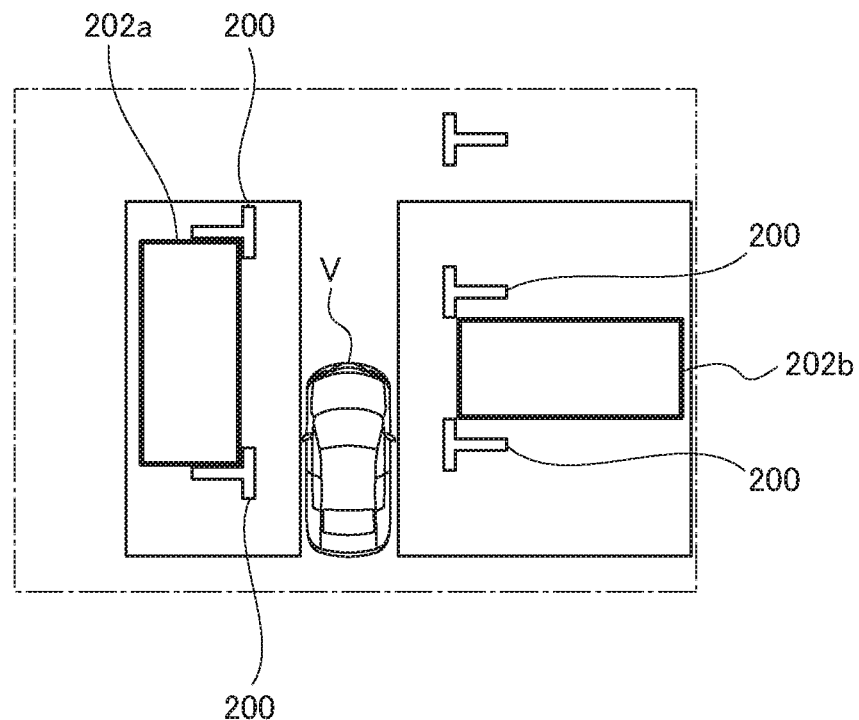
FIG. 11 is a schematic view illustrating an example of the function of the image processing device according to the embodiment.
Figure 12:
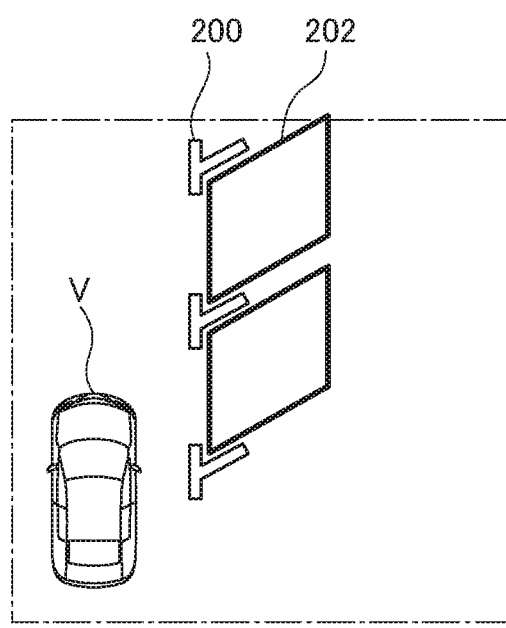
FIG. 12 is a schematic view illustrating an example of the function of the image processing device according to the embodiment.

In the image processing device 100 according to the present embodiment, the parking frame 202 is set not only by depending on the distance of the corner portions 203 but also considering the extending directions of the first and second white lines 201a, 201b. Accordingly, the parking frame 202 can appropriately be set in case of both the parking frame 202a for the parallel parking and the parking frame 202b for the perpendicular parking or side-by-side parking as shown in FIG. 11. In addition, the parking frame 202 can appropriately be set in case of the parking frame 202c for the angle parking as shown in FIG. 12 where the markers 200 includes the second white line 201b which is inclined relative to the first white line 201a and intersects thereto.

The embodiment of the present disclosure has been described with reference to the drawings. However, the specific configuration is not limited to the configuration according to the above embodiment and examples described above, and the present disclosure includes design changes which do not depart from the gist of the present disclosure.

As an example, the markers 200 which are detectable by the image processing device 100 according to the above embodiment are not limited to the illustrated embodiment, and the shape of the marker 200 is not limited if the corner portions 203 can be detected by the corner detector 111a. For example, a cross marker where the first white line 201a and the second white line 201b intersect each other at the center thereof may be used.

Also, in the image processing device 100 according to the above embodiment, the brightness values of the images are used to detect the black and white pixels, but the RGB values of the images may be used instead.

What is claimed is:

1. An image processing device, comprising:
   a marker detector configured to detect a plurality of markers on a road surface based on an image signal from an imager that takes an image of the road surface around a vehicle, each of the plurality of markers comprising first and second white lines extending in different directions;
   a parking frame detector configured to compute a pair of adjacent markers on the road surface among the detected plurality of markers, and to detect a parking frame defined by the pair of adjacent markers based on a distance between the pair of adjacent markers; and
   a shape estimator configured to detect extending directions of the first and second white lines of the markers that are included in the detected parking frame, and to estimate a shape of the parking frame based on the detected extending directions of the first and second white lines,
   wherein each of the markers comprises a corner portion defined by the first and second white lines intersecting each other,
   wherein the marker detector comprises a corner detector configured to detect the corner portion by detecting a corner in an image based on the image signal,
   wherein the shape estimator is further configured to:
      select one of the detected plurality of markers, and scan brightness values of pixels at a corner point of the selected one of the detected plurality of markers in directions considered to be perpendicular to the extending directions of the first and second white lines to detect extending directions of the first and second white lines, the corner point being formed at a point where outer boundary lines of the first and second white lines intersect;

determine an angle between the first and second white lines where the first and second white lines intersect each other based on the detected extending directions of the first and second white lines; and estimate the shape of the parking frame based on the determined angle.

2. The image processing device according to claim 1, wherein the corner detector is configured to detect the corner portion based on a brightness pattern of the image signal.

3. The image processing device according to claim 1, wherein the marker detector is configured to detect the marker based on a position of the corner portion detected by the corner detector.

4. The image processing device according to claim 1, wherein the corner detector is further configured to:

set a detection area comprising a plurality of pixels; and detect the corner portion by detecting the corner point based on a brightness value of the pixels in the detection area.

5. The image processing device according to claim 4, wherein the shape estimator is configured to:

select a pixel adjacent to the corner point; and determine a brightness value of the selected pixel.

6. A method for processing an image by an image processing device, comprising:

detecting a plurality of markers on a road surface based on an image signal from an imager that takes an image of the road surface around a vehicle, each of the plurality of markers comprising first and second white lines extending in different directions;

computing a pair of adjacent markers on the road surface among the detected plurality of markers, and detecting a parking frame defined by the pair of adjacent markers based on a distance between the pair of adjacent markers; and detecting extending directions of the first and second white lines of the markers that are included in the detected parking frame, and estimating a shape of the parking frame based on the detected extending directions of the first and second white lines, wherein each of the markers comprises a corner portion defined by the first and second white lines intersecting each other, wherein the detecting of the plurality of markers comprises detecting the corner portion by detecting a corner in an image based on the image signal, wherein the estimating of the shape of the parking frame further comprises:

selecting one of the detected plurality of markers, and scanning brightness values of pixels at a corner point of the selected one of the detected plurality of markers in directions considered to be perpendicular to the extending directions of the first and second white lines to detect extending directions of the first and second white lines, the corner point being formed at a point where outer boundary lines of the first and second white lines intersect;

determining an angle between the first and second white lines where the first and second white lines intersect each other based on the detected extending directions of the first and second white lines; and estimating the shape of the parking frame based on the determined angle.

7. The method according to claim 6, wherein the detecting of the corner portion comprises:

setting a detection area comprising a plurality of pixels; and detecting the corner portion by detecting the corner point based on a brightness value of the pixels in the detection area.

8. The method according to claim 7, wherein the estimating the shape of the parking frame comprises:

selecting a pixel adjacent to the corner point; and determining a brightness value of the selected pixel.

* * * * *